(No Model.) 3 Sheets—Sheet 1.
C. H. STOELTING.
ROLL HOLDING CAMERA.
No. 533,618. Patented Feb. 5, 1895.
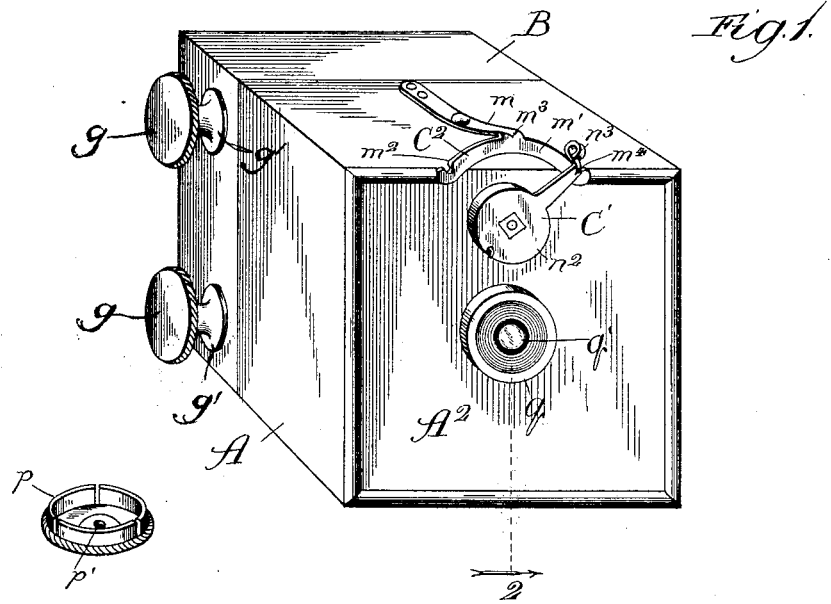
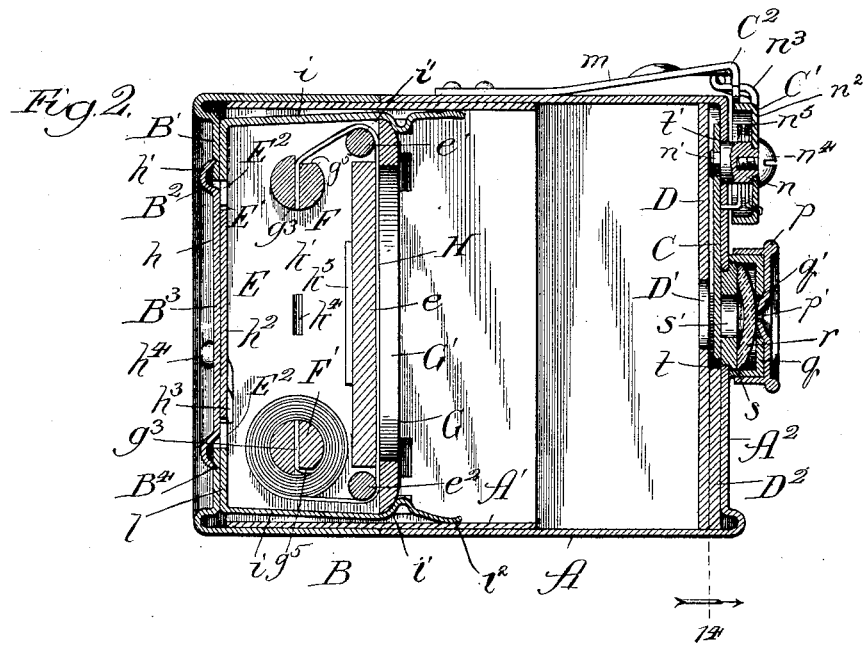
Witnesses:
Chas. E. Gaylord,
Lile J. Miller.
Inventor:
Christian H. Stoelting,
By Dyrenforth & Dyrenforth,
Attys.

(No Model.) 3 Sheets—Sheet 2.

C. H. STOELTING.
ROLL HOLDING CAMERA.

No. 533,618. Patented Feb. 5, 1895.

Witnesses:
Chas E Gaylord
Luth J Alter

Inventor:
Christian H. Stoelting,
By Dyrenforth & Dyrenforth
Attys (No Model.) 3 Sheets—Sheet 3.

C. H. STOELTING.
ROLL HOLDING CAMERA.

No. 533,618. Patented Feb. 5, 1895.

Witnesses:

Inventor:
Christian H. Stoelting,
By Dyrenforth & Dyrenforth,
Attys.

THE NORRIS PETERS CO., PHOTO-LITHO., WASHINGTON, D. C.

UNITED STATES PATENT OFFICE.

CHRISTIAN H. STOELTING, OF CHICAGO, ILLINOIS, ASSIGNOR TO ALFRED C. KEMPER, OF SAME PLACE.

ROLL-HOLDING CAMERA.

SPECIFICATION forming part of Letters Patent No. 533,618, dated February 5, 1895.

Application filed March 28, 1894. Serial No. 505,382. (No model.)

*To all whom it may concern:*

Be it known that I, CHRISTIAN H. STOELTING, a citizen of the United States, residing at Chicago, in the county of Cook and State of Illinois, have invented a new and useful Improvement in Roll-Holding Cameras, of which the following is a specification.

My invention relates to improvements in pocket cameras in which photographic negatives are taken upon a strip of sensitized film; and my object is to provide a camera of a size so small that it may be conveniently carried about in the pocket and be at the same time a highly effective and desirable device for its purpose, easy to operate and of a strong, durable and comparatively inexpensive construction.

Figure 3:
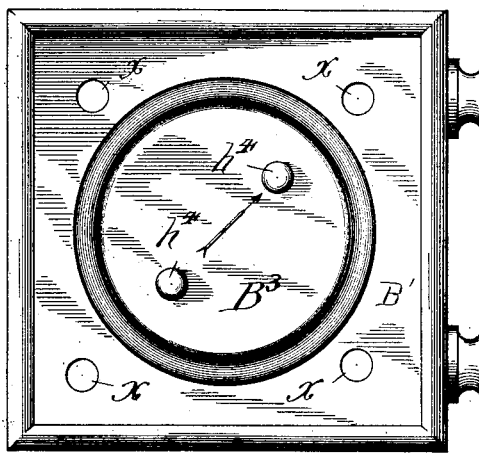
Figure 4:
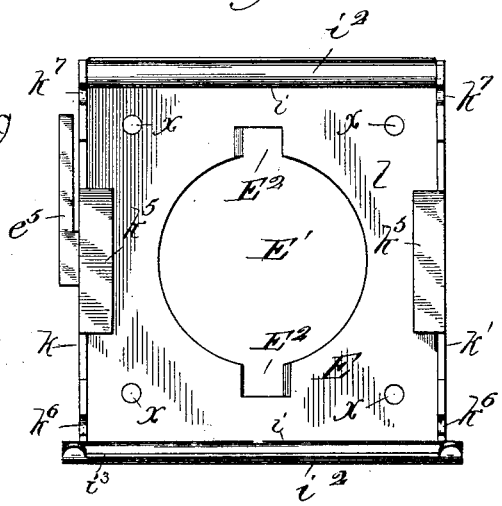
Figure 5:
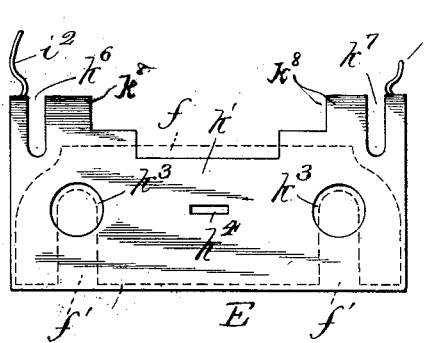
Figure 7:
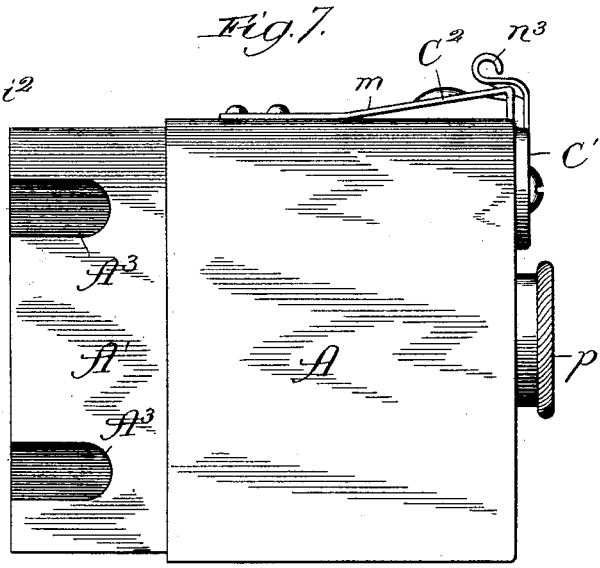
Figure 6:
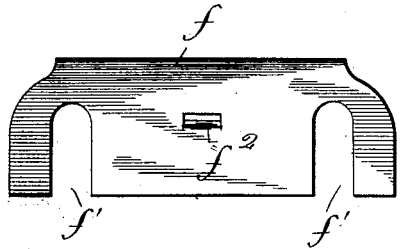
Figure 8:
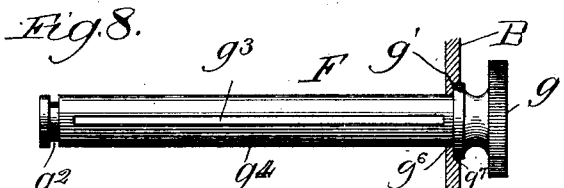
Figure 9:
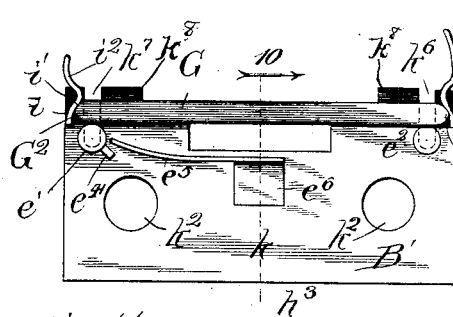
Figure 10:
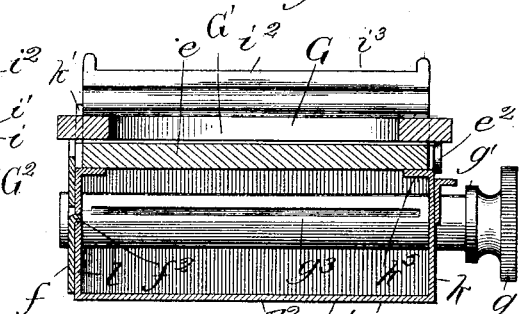
Figure 11:
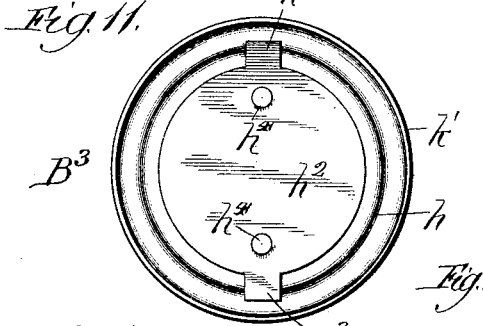
Figure 12:
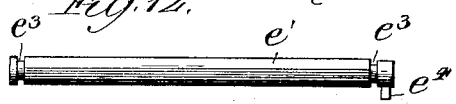
Figure 13:
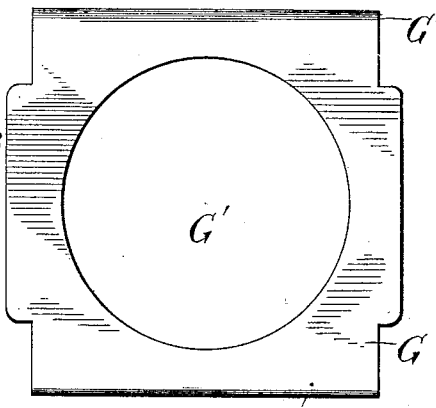
Figure 14:
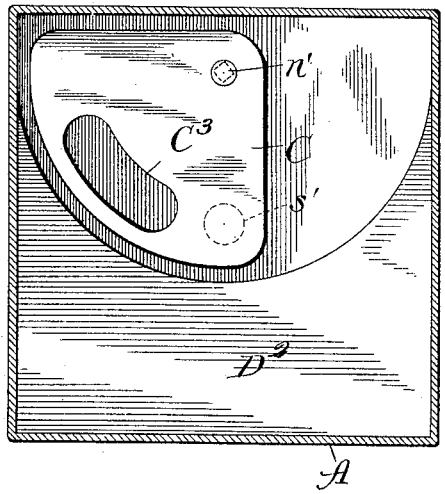
Figure 15:
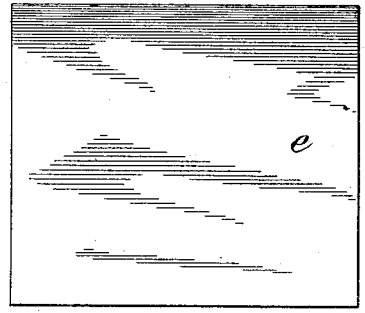

In the drawings—Figure 1 is a perspective view of my improved camera, with the perforated exposure-cap removed and laid to one side; Fig. 2, a section of the device, with the perforated exposure cap in place, taken on line 2 of Fig. 1; Fig. 3, a rear end elevation of the device; Fig. 4, a plan view of an inner roll holder-frame or casing, forming one of the details of construction; Fig. 5, a side elevation of the inner casing; Fig. 6, a detail view of a roller locking plate; Fig. 7, a side elevation of the front section of the inclosing case; Fig. 8, a broken section showing one of the film carrying rollers; Fig. 9, an elevation of the inner casing at the side opposite that shown in Fig. 5; Fig. 10, a section taken on line 10 of Fig. 9; Fig. 11, an inner face view of a removable cap for closing an opening in the rear end of the device; Fig. 12, one of the film guiding rollers; Fig. 13, a removable mat; Fig. 14, a section on line 14 of Fig. 2 showing the front inner face portion of the inclosing case; and Fig. 15, a removable platform.

The casing of the device is in two readily separable parts A and B; A being the front portion and B the rear portion and roll-holder. When made of metal, which is preferred, the front A and part B are preferably formed by stamping them; and, fastened in the part A is a ferrule A'. The ferrule fits closely and slides in the part B, until the meeting edges of the parts A and B come in contact, and the construction insures an absolutely light excluding or light-tight joint between the two parts. In the front side $A^2$ is a central opening $t$, into which is fitted and fastened a short circumferentially threaded tubular piece $s$ projecting beyond the front $A^2$ and having a central opening $s'$. Fitting upon the outer end of the tubular projection $s$ is a lens $r$ held in place by an inner cap-piece $q$, which is threaded on its inner surface to engage the thread on the tubular projection or lens bed $s$. The inner cap-piece $q$ holds the lens firmly in place and has a central opening $q'$ which registers with and is of approximately the same size as the opening $s'$. Fitting over the inner cap-piece is an outer cap-piece, or time exposure cap $p$, having a comparatively small central opening $p'$.

C is a swinging shutter, preferably of the form shown in Fig. 14. The shutter is fastened at one corner to an arbor $n$ which fits and turns in an opening $t'$ in the front plate $A^2$. At its inner end the arbor has a reduced and preferably squared portion $n'$ which passes through a correspondingly squared opening in the shutter. The shutter is confined against the shoulder of the arbor by upsetting the part $n'$ over the inner face of the shutter, and the latter is thus held in rigid relation to the arbor. At its outer end the arbor is reduced and preferably squared to receive the cup-shaped portion $n^2$ of a lever or latch C', having a bent catch engaging arm $n^3$. The latch is held to the arbor, in rigid relation therewith, by means of a screw $n^4$ which extends into a threaded socket in the end of the arbor.

Fastened upon the case, at its spring-arm portion $m$, is a catch $C^2$ having a segmental head-portion $m'$ describing an arc of which the arbor $n$ is the center. At its opposite ends the head-portion $m'$ is provided with latch-engaging notches or stops $m^2$, $m^3$, and $m^4$, as indicated.

In the shutter C is an oblong segmental opening $C^3$, which in the passage of the shutter, as it is swung from one side to the other, registers with the opening $s'$. Housed in the cup-shaped part of the latch C' is a coiled spring $n^5$, fastened at opposite ends, respectively, to the front plate $A^2$ and latch. The spring $n^5$ tends normally to turn the latch, arbor and shutter to the position wherein the latch engages the notch $m^2$, and the shutter closes the opening $s'$ as shown in Fig. 14. The latch may be turned, against the resistance of the spring, to engage with the notch $m^3$, wherein the shutter opening registers with the opening $s'$, or it may be turned to engage the notch $m^4$, wherein the shutter, at its part on the opposite side of its opening $C^3$, closes the opening $s'$. In the casing, just within the shutter, is a diaphragm D having a central opening D' registering with, and somewhat larger than, the opening $s'$. Beyond the path of the shutter is a separating-plate $D^2$, interposed between the front plate $A^2$ and diaphragm D, to maintain the diaphragm, which is placed against it, close to but out of contact with the shutter so that it will not interfere with the free movement of the latter.

In the roll-holder portion B is an inner frame or casing E formed with a base-plate $l$, turned-up sides $k\ k'$, and turned-up springy ends $i$. The frame E may be fastened in place, so that its turned up sides and ends will be approximately equidistant from the adjacent inner walls of the casing, by means of rivets $x$ passing through the base $l$ and back-plate B' of the casing. In the back plate B' is a comparatively large opening $B^2$, and registering therewith in the base-plate $l$ of the frame E is a somewhat smaller opening E' provided with offsets $E^2$. The opening $B^2$ E' is closed by a removable plug or cap-piece $B^3$ formed of an outer plate $h$, having a flanged edge $h'$, which overlaps the edge of the opening $B^2$ and extends into a shallow annular recess $B^4$ in the back B', and an inner plate $h^2$, to fit the opening E', provided with radial clamping projections $h^3$. The plates $h$ and $h^2$ are fastened together by rivets $h^4$ which form knobs on the outer side of the plate $h$. To insert the plug or cap-piece $B^3$ in place it is placed in the opening in a manner to cause its clamping projections $h^3$ to pass through the recesses or offsets $E^2$, and it is then turned to cause the clamping projections to pass behind the plate $l$. The plug may be readily turned by pressing the knobs with the finger-nails and the edges of the recesses $E^2$ may be beveled as indicated in Fig. 4, so that as the plug is turned it will be drawn tightly into place and be thoroughly light-excluding.

F F' are the film rollers, provided at their outer ends with thumb-knobs $g$, presenting annular shoulders $g'$, and provided at their inner ends with annular recesses $g^2$. Between their ends the rollers are provided with longitudinally extending film-engaging slots $g^3$, which extend through the shank portions $g^4$. The shanks $g^4$ are cut away at one side of their slots $g^3$, as shown in Fig. 2, to present beveled surfaces $g^5$ which facilitate the insertion of the ends of the sensitized strips into the slots, by causing the opposite edges of the slots to present projecting guide shoulders.

In the roll holder casing B, at one side are two round openings $g^6$ just large enough to receive the shank-portions of the film-rollers F F', and around the openings are recesses $g^7$ (Fig. 8) just large enough to receive the shoulder-portions $g'$ of the rollers. In line with the said openings are openings $k^2$ in the side $k$ of the inner frame, and openings $k^3$ in the side $k'$. The rollers are just long enough to extend with their recesses $g^2$ beyond the side $k'$, when their shoulders $g'$ engage the shoulders formed by the bases of the recesses $g^7$ in the outer surface of the roll-holder. The rollers are fastened in place by means of a spring-plate $f$, curved longitudinally, to a slight extent, and having slotted openings $f'$ just large enough to pass over the recessed portions $g^2$ of the rollers. The plate $f$ is passed with its concave face against the side $k'$ to engage at its slots $f'$ with the roller recesses $g^2$; and when in place an ear $f^2$ on the plate $f$ springs into and engages an opening $k^4$ in the side $k'$. The plate $f$ at its center bears against the side $k'$, and its springy end portions tend to draw the rollers inward whereby their shoulders $g'$ bear closely against the case in the recesses $g^7$ and form light excluding joints at the openings. The sides $k\ k'$ are formed with central inward projecting flanges affording shelves $k^5$, and near opposite ends they are provided with recesses $k^6\ k^7$. Resting on the shelves $k^5$ is a removable platen or platform $e$, and at opposite edges of the platform are removable rollers $e'\ e^2$ provided at their ends with recesses $e^3$ which fit into the recesses $k^6\ k^7$. The free edge-portions of the ends $i$ are bent to afford inclined or rounded shoulders $i'$ and rounded projections $i^2$, one of which is provided with a recess $i^3$ in its end.

G is a mat having an opening G' and beveled or rounded ends $G^2$, at which it fits under the rounded or inclined shoulders $i'$ of the ends $i$. Owing to the springy character of the ends $i$ the mat may be sprung into place, and the inclined shoulders $i'$ will tend to press the mat yieldingly toward the platform $e$. The opposite end portions of the side $k'$ extend above or beyond the surface of the platform $e$, while the side $k$ does not extend at any part beyond the said platform. The mat when in place extends against the stops $k^8$ afforded by the projecting parts of the side $k'$, and may be readily removed by sliding it from the shoulders $i'$ over the side $k$. As shown in Figs. 9 and 13, the mat is shaped the same at opposite sides and edges, so that either side may be at the platform and either edge at the stops $k^8$, which makes the insertion of the mat into place, while in a dark-room, easy to accomplish.

To insert a strip H of sensitized film into position the parts A and B are separated, and the mat, platen $e$ and rollers $e'$ are removed from the roll-holder. The film is then inserted at one end into the slot $g^3$ of one roller, say the roller F', and wound thereon until the opposite end of the film is reached, the latter being inserted into the slot $g^3$ of the roller F. While being wound upon the roller F', the film is caused to pass through the recess $i^3$ in the spring end, whereby it is guided to wind evenly upon the roller. The platen $e$ and rollers $e'$ $e^2$ are then passed beneath the film into position, and the film is then tightened across the platform and rollers $e'$ $e^2$ by turning the roller F'. The mat G is then sprung into place to bear yieldingly against the film so that the latter will extend flat across the platen. The rollers F F', work in their bearings with sufficient friction to maintain the film well stretched and taut across the rollers $e'$ $e^2$ and platen. The rollers $e'$ $e^2$ are roughened and the roller $e'$ is provided with a pin $e^4$ which wipes across a spring click $e^5$ fastened at $e^6$ upon the side $k$. The part A is then passed at its ferrule portion A' into the roll-holder, the ferrule having recesses $A^3$ which pass over the rollers F F' at the side $k$. The ferrule passes between the inner frame E and outer casing of the roll holder, and the spring projections $i^2$ bear against the inner surfaces of the ferrule to hold the parts in place with desired firmness.

The device is constructed with a view of making negatives which though small, shall possess a high degree of perfection. The outer casing when the two parts thereof are telescoped together and the shutter closed is absolutely light tight, and the inner surfaces are blackened to render them non-light reflecting.

The diaphragm D may be of blackened cardboard or hard-rubber, and serves to prevent the penetration of light into the case around the shutter; and the construction of the plug or cap $B^3$ prevents leakage of light through the back of the case. The mat G is preferably black and of gutta-percha, and the opening through it, which determines the boundaries of the negative may be either round, square or hexagonal.

Removal of the exposure cap $p$ enlarges the opening at the outer surface of the lens; and removal of the inner cap $q$ gives access to the lens whereby it may be cleaned when desired without disturbing the shutter.

To take a picture, the shutter catch is turned to the notch $m^4$, care being used by the operator to hold his finger over the lens opening while doing so, to prevent access of light to the case. The device is held in the hand and pointed at the object to be photographed, in the usual way, and pressure is exerted upon the catch $C^2$ to cause the latch C' to spring from the notch $m^4$ to the notch $m^2$. The spring $n^5$ is of the proper resilience, and the shutter opening $C^3$ of the proper dimensions to produce the proper length of exposure for snap or instantaneous views and the face of the sensitized film is just far enough from the lens to give the proper universal focus. The result of the exposure with the proper conditions of light, will be a negative substantially as perfect as those produced in the use of the best cameras of a larger size. For longer exposures the latch may be turned to the notch $m^3$ and sprung at the proper time. Before taking a second negative the film must be wound upon the roller F a distance equal to the length of the negative taken. To guide the operator the roller $e'$ may have a circumferential measurement equal to say one third the diameter of the opening G', whereby at the third sound of the click he will know that the negative has passed beyond the mat opening.

The device as I prefer to construct it is about one and five-eighths inches square and two inches long. The mat opening measures about one and one eighth inches across; the platen is about one and one quarter inches from the lens; and the rollers will hold a film capable of receiving twenty five or more negatives.

When the film is filled it may be withdrawn in a dark-room and developed, and a fresh film inserted into the roll-holder, as described. If desired, the film when filled with negatives and developed, may be photographed upon a transparent strip and the strip inserted into the device, the platen $e$ and plug or cap $B^3$ removed, and the latch C' turned to the notch $m^3$ so that the pictures may be viewed through the lens. The lens magnifies the picture and renders it particular distinct; and as the opening $p'$, which is of the proper size for time exposures, is rather too small for convenience in placing the lens to the eye, the cap $p$ may be removed. The cap $p$ should also be removed in making snap or instantaneous exposures.

While the click is desirable it may be dispensed with, and the rollers $e'$ $e^2$ also. If the rollers $e'$ $e^2$ are not employed the platen should be of greater width than that shown, and its edges should be rounded so that the film will be guided to slide readily over them without danger of injury.

I prefer to construct the device throughout as shown and described. It may however be modified in the matter of details of construction without departing from the spirit of my invention as defined by the claims.

What I claim as new, and desire to secure by Letters Patent, is—

1. In a camera, a casing formed with a front part A and a rear part, or roller-holder, B, the parts telescoping together and each having sides which afford meeting edges, an exposure opening and shutter in the part A, an inner frame E in the part B having sides parallel with and out of contact with the sides of the part B, film-rollers extending through openings in one side of the part B and through coincident bearing openings in the sides of the frame E, and supports on the frame E for a removable mat and platen, substantially as described.

2. In a camera, the combination with the casing provided with an exposure opening, of a swinging shutter at said opening, inside the casing, an arbor $n$ to which the shutter is rigidly secured extending through and journaled in the casing, a cup-shaped latch secured to the arbor on the outside of the case, a coiled spring housed by the latch, and a spring catch on the case with which the latch engages when turned against the resistance of the spring, substantially as and for the purpose set forth.

3. In a camera, such as described, a roll-holder, forming the part B of the casing, and provided with an inner frame, having a base, at which it is secured to the part B, sides provided with bearings for the film-rollers and supporting shelves for a platen, and spring ends provided with inclined shoulders to receive a removable mat and press it in the direction of the platen, substantially as described.

4. In a camera, such as described, a roll-holder, forming the part B of the casing, and provided with an inner frame, having a base, at which it is secured to the part B, sides provided with bearings for the film-rollers, bearings for film-guiding rollers and supporting-shelves for a platen, and spring ends provided with inclined shoulders to receive a removable mat and press it in the direction of the platen, substantially as described.

5. In a camera, such as described, a roll-holder, forming the part B of the casing, having film-roller bearing openings $g^6$ surrounded by recesses $g^7$ and an inner frame having sides provided with roller-bearing openings, in combination with film-rollers, having knobs $g$ at one end provided with shoulders $g'$, and recesses $g^2$ at their opposite ends, and a spring plate bearing against the frame and engaging the recesses $g^2$ and operating to hold the rollers at their shoulders $g'$ against the outer surface of the casing in the recesses $g^7$, substantially as described.

6. In a camera, such as described, a roll-holder forming the part B of the casing and provided with an inner frame having a base, sides $k\ k'$, and spring-ends $i$ formed with inclined shoulders $i'$, in combination with a removable mat having inclined ends to fit under the said shoulders, substantially as described.

7. In a camera, such as described, a roll-holder provided with an inner frame E, having film-roller bearing sides $k\ k'$ and an end $i$ provided with a film-guiding recess $i^3$, substantially as and for the purpose set forth.

8. In a camera, such as described, a roll-holder forming the part B of the casing, provided with an inner frame, having a base, sides $k\ k'$ formed with shelves $k^5$, film-roller bearing-openings, and guide-roller bearing slots $k^6\ k^7$, and spring ends $i$ formed with inclined shoulders $i'$, in combination with film rollers F, F', in the said film-roller bearings, a removable platen $e$ on the shelves $k^5$, removable mat G, fitting between the shoulders $i'$ guide-rollers $e'$ in the bearing slots $k^6\ k^7$, a spring click on the frame, and a click engaging projection on one of the guide-rollers $e'$, substantially as and for the purpose set forth.

CHRISTIAN H. STOELTING.

In presence of—
M. J. FROST,
WM. NICHOLAS WILLIAMS.